M. PICCIANO & T. RUBINO.
SPRING WHEEL.
APPLICATION FILED SEPT. 14, 1916.
1,208,201.   Patented Dec. 12, 1916.
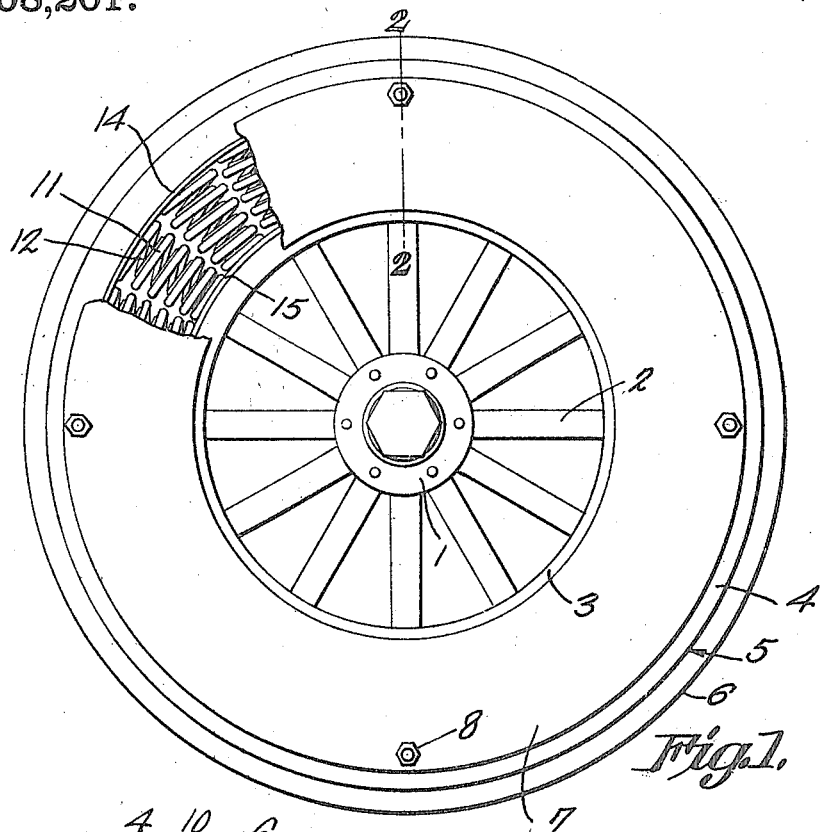
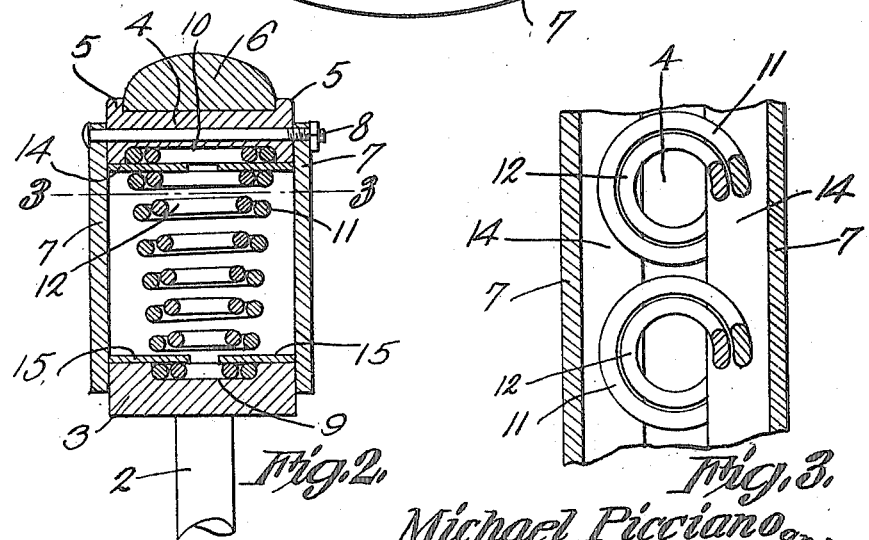
Witnesses
Michael Picciano and
Thomas Rubino, Inventors
by C. A. Snow & Co.
Attorneys

UNITED STATES PATENT OFFICE.

MICHAEL PICCIANO AND THOMAS RUBINO, OF HAZLETON, PENNSYLVANIA.

SPRING-WHEEL.

1,208,201.  Specification of Letters Patent.  Patented Dec. 12, 1916.

Application filed September 14, 1916. Serial No. 120,144.

*To all whom it may concern:*

Be it known that we, MICHAEL PICCIANO and THOMAS RUBINO, citizens of the United States, residing at Hazleton, in the county of Luzerne, State of Pennsylvania, have invented a new and useful Spring-Wheel, of which the following is a specification.

The device forming the subject matter of this application is a spring wheel, and one object of the present invention is to provide a device of this type in which pneumatic tires and other elements subject to puncture and deterioration may be dispensed with.

A further object of the invention is to provide a novel spring construction which is interposed between the felly and the outer rim of the wheel.

Another object of the invention is to provide novel means for retaining the cushioning springs in place.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in side elevation, a wheel constructed in accordance with the present invention, parts being broken away; Fig. 2 is a section taken approximately on the line 2—2 of Fig. 1; Fig. 3 is a fragmental section taken approximately on the line 3—3 of Fig. 2, distant parts being omitted.

In carrying out the present invention there is provided a hub 1 from which radiate spokes 2 supporting a felly 3.

The numeral 4 designates an outer rim which may be constructed in various ways. The outer rim 4 may have side flanges 5 between which is located a tire 6. The tire 6 may be made out of some cushioning material. The function of the tire 6 is to prevent noise, but if noise is unobjectionable, the tire 6 may be dispensed with.

The numeral 7 designates a pair of annular side plates. Securing elements 8, which may be bolts, pass through the side plates 7 and through the outer rim 4. The side plates 7 slide in contact with the side edges of the felly 3.

In the inner surface of the outer rim 4, seats 10 are fashioned. Seats 9 are formed in the outer face of the felly 3.

The numeral 11 designates exterior springs, the outer ends of which are received in the seats 10 of the outer rim 4, the inner ends of the exterior springs 11 being received in the seats 9 of the felly 3. Located inside of the springs 11 are interior springs 12. The ends of the springs 12 are engaged in the seats 9 and 10, in the manner hereinbefore set forth in connection with the exterior springs 11. As many interior springs 12 will be provided as is considered expedient or necessary, thereby to render the wheel more or less stiff, and to enable it to support the necessary load. The springs 11 and 12 are of conical form, the wider ends of the springs being disposed outwardly.

The invention comprises a pair of outer rings 14. These rings 14 engage the inner face of the outer rim 4, and engage the outer ends of the springs 11 and 12. The invention comprises a pair of inner rings 15 surrounding the felly 3 closely. The rings 15 engage the inner ends of the springs 11 and 12 and hold the inner ends of the springs in the seats 9. The rings 14 preferably are not attached to the outer rim 4, and the rings 15 preferably are not attached to the felly 3. The side plates 7 serve to prevent the rings 15 and 14 from moving sidewise.

In practical operation, the rings 14 and 15 at one side of the wheel are mounted in place, and then the ends of the springs 11 and 12 are engaged with these rings. Subsequently, the pair of rings on the other side of the wheel is pushed into place and coöperates with the ends of the springs in a manner which will be clearly understood from the drawings.

Having thus described the invention, what is claimed is:—

1. In a device of the class described, a felly having seats in its outer face; an outer rim having seats in its inner face; helical springs having their ends engaging the respective seats; inner rings surrounding the felly and engaging the inner convolutions of the springs; outer rings coacting with the inner face of the outer rim and engaging the outer ends of the springs; and side plates secured to the rim, the side plates engaging all of the rings to prevent the same from moving laterally, the side plates being slidably engaged with the felly.

2. In a device of the class described, a felly; a rim, the felly and the rim constituting coöperating elements; side plates slidably engaged with one of said coöperating elements; means for securing the side plates to the other of said coöperating elements; helical springs abutting at their outer ends against the rim, the inner ends of the springs abutting against the felly; inner rings surrounding the felly and restrained against outward movement by the side plates, the inner rings coacting with the inner ends of the springs to hold the same on the felly; and outer rings coacting with the inner face of the rim, the side plates coacting with the outer rings to hold the same against outward movement, the outer rings engaging the outer ends of the springs to hold the same on the rim.

In testimony that we claim the foregoing as our own, we have hereto affixed our signatures in the presence of two witnesses.

MICHAEL PICCIANO.
THOMAS RUBINO.

Witnesses:
A. G. WALLACE,
ANGELO GREGA.